(12) United States Patent
Grammer et al.

(10) Patent No.: US 7,883,139 B2
(45) Date of Patent: Feb. 8, 2011

(54) DRAINAGE ARRANGEMENT

(75) Inventors: Martin Grammer, Ludwigsburg (DE);
Markus Schmid, Moensheim (DE);
Bela Molnar, Ehningen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/711,571

(22) Filed: Feb. 24, 2010

(65) Prior Publication Data

US 2010/0237652 A1 Sep. 23, 2010

(30) Foreign Application Priority Data

Mar. 17, 2009 (DE) .................. 10 2009 013 508

(51) Int. Cl.
*B60J 9/00* (2006.01)
(52) U.S. Cl. .................. 296/154; 296/208; 296/180.1
(58) Field of Classification Search ................. 296/154, 296/208, 180.1
See application file for complete search history.

(56) References Cited

U.S. PATENT DOCUMENTS

| | | | | |
|---|---|---|---|---|
| 4,176,877 | A | * 12/1979 | Schulz et al. | ............... 296/208 |
| 5,417,465 | A | 5/1995 | Koppenstein | |
| 5,709,309 | A | * 1/1998 | Gallagher et al. | ........... 220/229 |
| 5,873,623 | A | * 2/1999 | Dunton et al. | .............. 296/154 |
| 6,450,563 | B2 | * 9/2002 | Yee | ............................. 296/154 |
| 6,578,901 | B2 | * 6/2003 | Sommer | ..................... 296/154 |
| 7,374,234 | B2 | 5/2008 | Deschatres et al. | |

FOREIGN PATENT DOCUMENTS

| | | |
|---|---|---|
| DE | 92 16 455.2 | 3/1993 |
| DE | 42 15 750 | 4/1993 |
| DE | 10 2005 045 292 | 4/2007 |
| FR | 2 892 978 | 5/2007 |
| JP | 6-115459 | 4/1994 |
| JP | 10-226240 | 8/1998 |

* cited by examiner

*Primary Examiner*—Joseph D Pape
(74) *Attorney, Agent, or Firm*—Gerald E. Hespos; Michael J. Porco

(57) ABSTRACT

A drainage arrangement for a tailgate of a motor vehicle body has water outflow spouts in the inner panel of the tailgate. The water outflow spouts are arranged correspondingly to water outflow openings in a rear part or a rear-end trim panel of the body behind a vehicle license plate as viewed in relation to the direction of travel.

10 Claims, 1 Drawing Sheet

DRAINAGE ARRANGEMENT

CROSS-REFERENCE TO RELATED APPLICATIONS

This application claims priority under 35 USC 119 to German Patent Application No. 10 2009 013 508.1 filed on Mar. 17, 2009, the entire disclosure of which is incorporated herein by reference.

BACKGROUND OF THE INVENTION

1. Field of the Invention

The invention relates to a drainage arrangement for a tailgate of a motor vehicle body.

2. Description of the Related Art

DE 10 2005 045 292 A1 discloses a drainage arrangement for a cavity of a motor vehicle body. The motor vehicle body of DE 10 2005 045 292 A1 has an outflow hole and the drainage arrangement has a sealing element held at the periphery in a sealing fashion in the outflow hole of the body. Furthermore, a closure element is provided for sealing off a drainage opening of the sealing element. The closure element is moved into a passage position when acted on by the pressure of water that has collected in the cavity.

DE 92 16 455 U1 discloses a water outflow device for the removal of moisture from body cavities in motor vehicles. The water outflow device of DE 92 16 455 U1 has a spout with an annular groove for inserting into a bore of a panel wall. The spout is delimited at one side by an annular collar that can be placed to bear at the inside against the panel wall and delimited at the other side by an annular shoulder that can be supported at the outside against the panel wall. An outflow funnel is formed integrally on the spout.

An object of the invention is to create a drainage arrangement for a tailgate of a motor vehicle that enables a targeted discharge of residual water or water droplets from the interior of the tailgate to the outside in a concealed fashion.

SUMMARY OF THE INVENTION

The invention relates to a drainage arrangement for a tailgate of a motor vehicle so that water that has infiltrated the tailgate from the outside, or other residual water, is discharged from the interior of the tailgate in such a way that no visible water runs are formed on the outer surfaces of the tailgate or on a painted rear-end trim panel. The drainage arrangement may utilize, for example, a deployable wind-deflecting device. The drainage of water from the inside of the tailgate advantageously is achieved by water outflow spouts being arranged correspondingly to water outflow openings in the rear-end trim panel of the body, and preferably behind a vehicle license plate as viewed in relation to the direction of travel.

The water outflow openings each have a formed portion aligned inwards in relation to the direction of travel for a vertical outflow of water droplets or other residual water from the water outflow spouts of the tailgate. In this way, dripping points of the water droplets onto the rear-end trim panel advantageously are situated in front of the vehicle licence plate or license plate depression in relation to the direction of travel.

An upper wall part of the rear-end trim panel of the vehicle body preferably is spaced from the vehicle license plate and forms a duct-like water outflow guide to the water outflow opening in the rear part or rear-end trim panel. A wall part that adjoins the water outflow opening from below is arranged to bear against the vehicle license plate. The duct-like water outflow guide and the formed portion are aligned so that the water droplets can be supplied from above to an underbody trim panel in the interior of the rear part or rear-end trim panel of the vehicle body. In this way, the water droplets advantageously are guided positively in the interior of the rear-end trim panel to the underbody trim panel of the vehicle body. The water droplets can dry up at this location and do not run down in a way that would be visible from the outside. As a result, there are no water runs below the vehicle license plate and visible from the outside.

The water outflow spouts in the tailgate preferably are arranged at both sides of a vehicle longitudinal central axis. More particularly, the water outflow openings are arranged in a holder for the vehicle license plate in the region of a licence plate depression in the rear part or rear-end trim panel of the vehicle body. Furthermore, the water outflow spouts in the tailgate are arranged relative to the outflow openings in the underlying rear part of the vehicle body so that the water droplets are guided to impinge on the upper wall of the rear part near a rear edge. In this way, the outflow openings advantageously are hidden by the vehicle license plate. Additionally, as a result of the dripping point on the rear edge of the rear-end trim panel, the water droplets are guided on the upper wall of the rear-end trim panel to the respective outflow opening.

An exemplary embodiment of the invention is illustrated in the drawings and is described in more detail below.

DETAILED DESCRIPTION OF THE PREFERRED EMBODIMENT

Figure 1:
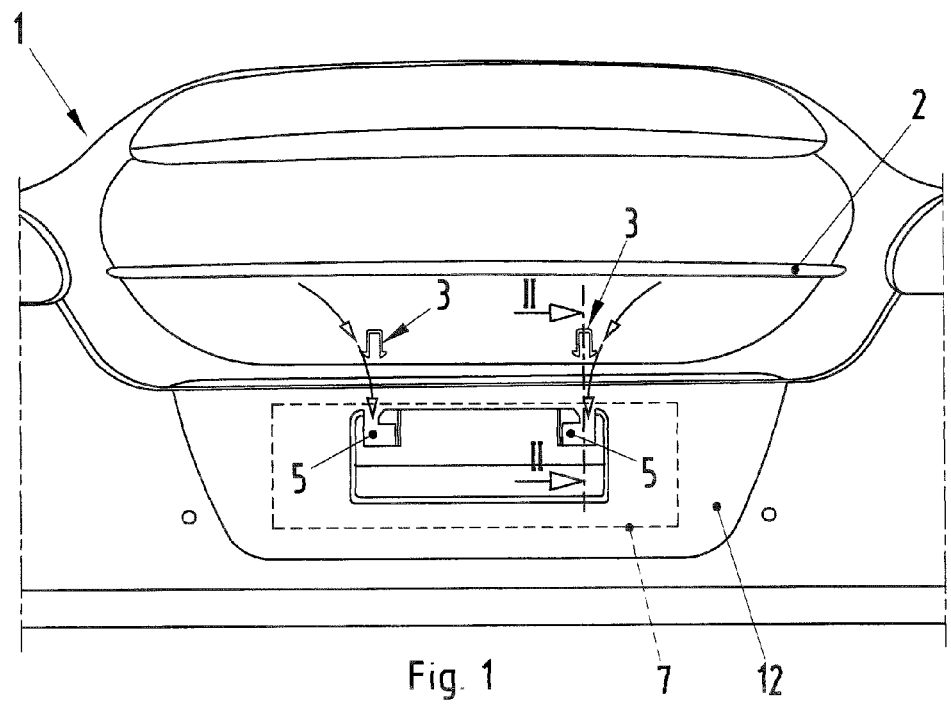
FIG. 1 is a rear elevational view of a motor vehicle with tailgate and rear-end trim panel and also wind-deflecting device in the tailgate.
Figure 2:
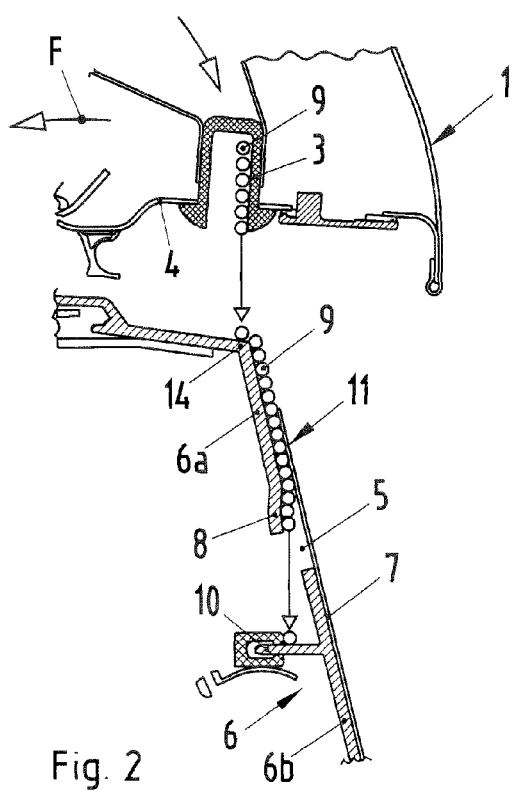
FIG. 2 is a cross-sectional view taken along line II-II of FIG. 1 through the tailgate and through the rear-end trim panel in the region of the water outflow spouts and the water outflow openings.

FIGS. 1 and 2 illustrate a tailgate 1 for a motor vehicle that incorporates a drainage arrangement in accordance with the invention. The tailgate 1 is provided with an extendable wind-deflecting device 2 and has water outflow spouts 3 in an inner panel 4 of the tailgate 1. The water outflow spouts 3 are provided correspondingly to water outflow openings 5 in a rear-end trim panel 6. More particularly, the water outflow openings 5 are arranged in a recessed holder 12 of the rear-end trim panel 6 and behind a vehicle license plate 7, which is indicated by dashed lines in FIG. 1.

The rear-end trim panel 6 has an upper wall part 6a and a lower wall part 6b that are spaced vertically from one another, as shown in FIG. 2. The upper wall part 6a of the rear end trim panel 6 has two laterally spaced formed portions 8 that project inwardly and forward relative to the direction of travel F to define upper sides of each outflow opening 5. The upper wall part 6a and the formed portion 8 have a profile configured so that water droplets 9 or residual water can emerge through the water outflow openings 5 behind the wall part 6b, and impinge substantially vertically on an underbody trim panel 10 of the vehicle body.

A duct-like section 11 is formed between the vehicle license plate 7 and the upper wall part 6a of the rear-end trim panel 6. Water droplets 9 that emerge from the water outflow spout 3 are guided positively through the duct-like section 11 and to the water outflow opening 5. The vehicle license plate 7 bears against the lower wall part 6b. As a result, the water droplets 9 cannot emerge outside the rear-end trim panel 6, but rather flow through the water outflow openings 5 behind the wall part 6b, and impinge substantially vertically on an underbody trim panel 10 of the vehicle body.

The water outflow spouts 3 in the tailgate 1 are arranged at least at both sides of a vehicle longitudinal axis and the water outflow openings 5 are provided in the holder 12 for the vehicle license plate 7.

As illustrated in more detail in FIG. 2, the water droplets 9 in the tailgate 1 drop out onto a rear edge 14 of the rear-end trim panel 6 and then are conducted via the duct-like guide 11 to the outflow opening 5, and from here to the underbody trim panel 10 of the vehicle body.

What is claimed is:

1. A drainage arrangement for a rear end of a motor vehicle body, the rear end having an inner panel and an outer panel outwardly and rearward of the inner panel, the outer panel being formed with a holder for a license plate, the drainage arrangement comprising: water outflow spouts formed in the inner panel at a location aligned with and above the holder for the license plate, water outflow openings formed in a wall of the outer panel that defines the holder for the license plate and forward of the license plate as viewed in relation to a forward direction of travel.

2. The drainage arrangement of claim 1, wherein the water outflow openings each have a formed portion projecting inward and forward relative to the forward direction of travel to define channels for a vertical outflow of water droplets from the water outflow spouts.

3. The drainage arrangement of claim 2, wherein the outer panel has an upper wall part spaced forward from the license plate so that a water outflow guide to the water outflow opening is defined between the upper wall part of the outer panel and the license plate, the outer panel further having a lower wall part defining a lower edge of the water outflow opening and disposed to bear against the license plate.

4. The drainage arrangement of claim 3, wherein the water outflow guide and the formed portion are aligned to guide the water droplets from the water outflow spouts formed in the inner panel to an underbody trim panel inwardly of the outer panel.

5. The drainage arrangement of claim 1, wherein the water outflow spouts are arranged at least at both sides of a vehicle longitudinal central axis.

6. The drainage arrangement of claim 5, wherein the holder for the license plate is a depression in the outer panel and the water outflow openings are arranged in the depression.

7. The drainage arrangement of claim 1, wherein the water outflow spouts are arranged so that the water droplets are guided to impinge on a rear edge region of an upper wall of the outer panel.

8. A drainage arrangement for a tailgate of a motor vehicle body, the tailgate having an inner panel and a rear end trim panel outwardly and rearward of the inner panel, the rear end trim panel being formed with a recessed license plate holder, the drainage arrangement comprising:

water outflow spouts formed in the inner panel at a location aligned with and above the recessed license plate holder;

rearwardly concave formed portions in the recessed license plate holder of the rear end trim panel at locations aligned with and below the water outflow spouts; and water outflow openings in portions of the rear end trim panel aligned with and below the formed portions.

9. The drainage arrangement of claim 8, wherein the rear end trim panel has an upper wall portion and a lower wall portion, the formed portions being in the upper wall portion.

10. The drainage arrangement of claim 9, further comprising a license plate mounted in the recessed license plate holder, the license plate being in substantially face to face engagement with the lower wall portion and being spaced rearward of the upper wall portion to define water outflow guides between the water outflow spouts and the water outflow openings.

* * * * *